(12) United States Patent
Goodarzi et al.

(10) Patent No.: US 12,304,444 B2
(45) Date of Patent: May 20, 2025

(54) METHODS AND SYSTEMS FOR AUTOMATIC TRAILER BRAKE GAIN SCALING

(71) Applicant: GM GLOBAL TECHNOLOGY OPERATIONS LLC, Detroit, MI (US)

(72) Inventors: Avesta Goodarzi, Whitby (CA); Utkarsh Saini, Pickering (CA); Patrick Giancarlo Gabriel DiGioacchino, Niagara Falls (CA); Hasan Alper Hepguvendik, Milton (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 158 days.

(21) Appl. No.: 18/166,955

(22) Filed: Feb. 9, 2023

(65) Prior Publication Data
US 2024/0270213 A1   Aug. 15, 2024

(51) Int. Cl.
*B60T 7/20* (2006.01)
*B60T 8/1755* (2006.01)
*B60T 8/18* (2006.01)
*B60T 13/66* (2006.01)

(52) U.S. Cl.
CPC .............. *B60T 7/20* (2013.01); *B60T 8/1755* (2013.01); *B60T 8/1856* (2013.01); *B60T 8/1887* (2013.01); *B60T 13/662* (2013.01)

(58) Field of Classification Search
CPC ........ B60T 7/20; B60T 8/1755; B60T 8/1856; B60T 8/1887; B60T 13/662

USPC .......................................................... 701/70
See application file for complete search history.

(56) References Cited

U.S. PATENT DOCUMENTS

| | | | | |
|---|---|---|---|---|
| 3,893,692 A | * | 7/1975 | Presley | B60T 8/1708 188/112 A |
| 5,080,445 A | * | 1/1992 | Brearley | B60T 8/323 303/7 |
| 5,333,948 A | * | 8/1994 | Austin | B60T 13/74 188/DIG. 1 |
| 5,713,639 A | * | 2/1998 | Doto | B60T 13/665 303/3 |
| 6,042,196 A | * | 3/2000 | Nakamura | B60T 7/12 303/7 |
| 6,139,118 A | * | 10/2000 | Hurst | B60T 7/20 303/7 |
| 6,705,684 B1 | * | 3/2004 | Garvey | B60T 13/74 188/112 A |
| 7,401,871 B2 | * | 7/2008 | Lu | B60T 8/17552 303/146 |
| 8,930,114 B1 | * | 1/2015 | Reid | B60T 8/1708 280/204 |
| 9,020,729 B2 | | 4/2015 | Maitlen et al. | |

(Continued)

*Primary Examiner* — Kurt Philip Liethen
*Assistant Examiner* — John D Bailey
(74) *Attorney, Agent, or Firm* — Lorenz & Kopf LLP

(57) ABSTRACT

Methods and systems automatically scale and set trailer brake gain without a need for vehicle driver input and without testing. Scaling a trailer brake gain of a trailer towed by a vehicle includes obtaining sensor data via one or more sensors of the vehicle. A processor computes a trailer weight of the trailer and a trailer resistance force of the trailer. The processor automatically updates the trailer brake gain based on both the trailer weight and the trailer resistance force and may use vehicle data and axle torque.

20 Claims, 7 Drawing Sheets

(56) References Cited

U.S. PATENT DOCUMENTS

| | | | |
|---|---|---|---|
| 9,026,311 B1* | 5/2015 | Pieronek | B60T 8/1708 |
| | | | 280/455.1 |
| 9,738,125 B1* | 8/2017 | Brickley | H04W 4/70 |
| 9,908,377 B2* | 3/2018 | Allcorn | B60T 8/1701 |
| 10,252,589 B2* | 4/2019 | Sielhorst | B60D 1/54 |
| 10,363,910 B2* | 7/2019 | Kulkarni | B60T 7/20 |
| 10,670,479 B2* | 6/2020 | Reed | G01L 5/136 |
| 10,703,345 B2 | 7/2020 | Niedert et al. | |
| 10,836,366 B2 | 11/2020 | James et al. | |
| 11,014,417 B2* | 5/2021 | Reed | G01L 5/0004 |
| 11,084,342 B2* | 8/2021 | Reed | G01L 5/136 |
| 11,135,882 B2* | 10/2021 | Reed | G01L 5/047 |
| 11,167,737 B2 | 11/2021 | Falcon et al. | |
| 11,221,262 B2* | 1/2022 | Reed | G01G 3/15 |
| 11,225,235 B2 | 1/2022 | DiGioacchino et al. | |
| 11,485,330 B1* | 11/2022 | Kulkarni | B60D 1/62 |
| 11,524,663 B2* | 12/2022 | Prohaszka | B60T 17/22 |
| 2006/0071549 A1* | 4/2006 | Chesnut | B60T 7/16 |
| | | | 303/3 |
| 2007/0001509 A1* | 1/2007 | Brown | B60K 35/00 |
| | | | 303/123 |
| 2011/0042154 A1* | 2/2011 | Bartel | B60W 10/184 |
| | | | 180/11 |
| 2014/0046566 A1* | 2/2014 | Maitlen | B60T 8/1701 |
| | | | 701/70 |
| 2015/0232075 A1* | 8/2015 | Fosdike | B60T 7/20 |
| | | | 701/70 |
| 2015/0275991 A1* | 10/2015 | De Leon | B60T 7/203 |
| | | | 188/162 |
| 2015/0353063 A1* | 12/2015 | Tuhro | B60T 8/1708 |
| | | | 701/70 |
| 2017/0001639 A1* | 1/2017 | Dempsey | G08G 1/16 |
| 2018/0079394 A1* | 3/2018 | Cekola | B60T 8/1708 |
| 2018/0215358 A1* | 8/2018 | Hall | B60T 8/3205 |
| 2018/0339685 A1* | 11/2018 | Hill | B60T 13/662 |
| 2019/0225196 A1* | 7/2019 | Niedert | B60T 8/1806 |
| 2020/0031326 A1* | 1/2020 | Henriksson | B60T 7/20 |
| 2020/0290579 A1* | 9/2020 | Lievore | G01G 19/12 |
| 2022/0017050 A1* | 1/2022 | Lievore | B60B 35/04 |
| 2023/0227011 A1* | 7/2023 | Zengin | B60T 8/1755 |
| | | | 701/70 |
| 2023/0242084 A1* | 8/2023 | Fosdike | B60T 8/245 |
| | | | 188/71.1 |
| 2024/0042976 A1* | 2/2024 | Kirmaier | B60T 13/26 |
| 2024/0067148 A1* | 2/2024 | Ripley | B60T 13/662 |
| 2024/0208473 A1* | 6/2024 | Lievore | B60G 11/113 |
| 2024/0262322 A1* | 8/2024 | Castillo | B60D 1/06 |

* cited by examiner

METHODS AND SYSTEMS FOR AUTOMATIC TRAILER BRAKE GAIN SCALING

INTRODUCTION

The present disclosure relates to methods and systems for controlling braking of a trailer coupled with a vehicle, and more particularly relates to automatic trailer brake gain scaling based on vehicle data.

Many vehicles are equipped for towing a trailer that is selectively coupled to the vehicle. Some of these vehicles include functionality for controlling the brake signal sent to the trailer to scale the braking force applied by the trailer brakes. This requires a trailer brake controller that may be original equipment on a vehicle or may be added as an aftermarket product. The trailer brake controller allows the driver to control the intensity of the signal sent to the trailer's brakes to suit the operating conditions. For example, it may be desirable for the trailer brakes to apply a higher relative force when the weight of the load on the trailer is higher. Delivering the appropriate signal intensity involves several steps to set the gain using the trailer brake controller. The controller has a range of gain levels (such as 1-10), covering a minimum to maximum signal intensity.

Setting the gain may involve manually making an initial selection, testing the braking response of the trailer, making an adjustment to the gain setting, and repeating until an acceptable amount of braking force results. The routine involves a number of steps and should be repeated every time operating conditions change. In addition, testing, such as by operating the brakes and observing the response of the trailer is undertaken. Finding the optimum setting may be challenging. Setting the gain too high may result in the trailer wheels undesirably locking up during braking. Setting the gain too low means the towing vehicle's brakes do the majority of the work, leading to suboptimal stopping distances.

Accordingly, it is desirable to provide improved methods and systems for controlling braking of a trailer that is coupled to a vehicle. It would also be desirable to set the gain without making manual selections and to provide optimal control of the braking of the trailer at various different speeds and conditions. Furthermore, other desirable features and characteristics of the present disclosure will become apparent from the subsequent detailed description and the appended claims, taken in conjunction with the accompanying drawings and the foregoing technical field and background.

SUMMARY

Methods and systems automatically set trailer brake gain without a need for vehicle driver input and without testing. In a number of embodiments, a method for scaling a trailer brake gain of a trailer towed by a vehicle includes obtaining sensor data via one or more sensors of the vehicle. A processor computes a trailer weight of the trailer and a trailer resistance force of the trailer. The processor automatically updates the trailer brake gain based on both the trailer weight and the trailer resistance force.

In additional embodiments, the sensor data includes a speed of the vehicle, an acceleration of the vehicle, a steering angle of the vehicle, and a brake state of the vehicle.

In additional embodiments, the processor computes a vehicle weight of the vehicle and a vehicle resistance force of the vehicle.

In additional embodiments, the processor computes a brake utilization factor of the trailer. The brake utilization factor is a function of certain parameters including the vehicle weight and the trailer weight.

In additional embodiments, computing the trailer weight includes computing the vehicle, computing a combined weight of the trailer and the vehicle together, and subtracting the vehicle weight from the combined weight.

In additional embodiments, the processor computes a trailer vertical axle load based on the trailer weight and on a vertical load on a tongue of the trailer. The processor computes the trailer brake gain based on an optimum trailer brake force that is proportional to the trailer vertical axle load and vehicle deceleration.

In additional embodiments, a vehicle brake-force pressure constant is computed by the processor, and a vehicle braking force is determined based on the vehicle brake-force pressure constant and a brake state of the vehicle.

In additional embodiments, an actual trailer brake force, an optimum trailer brake force, and a brake utilization factor of the trailer are computed by the processor. The brake utilization factor is the actual trailer brake force divided by the optimum trailer brake force.

In additional embodiments, the updating is accomplished entirely and independently by the processor without manual input.

In additional embodiments, an identifier module of a controller computes the trailer resistance force using an identification method.

In a number of additional embodiments, a system for scaling a trailer brake gain of a trailer towed by a vehicle includes sensors of the vehicle configured to provide sensor data. A processor computes a trailer weight of the trailer and a trailer resistance force of the trailer based on the sensor data. The processor automatically updates the trailer brake gain based on both the trailer weight and the trailer resistance force.

In additional embodiments, the sensor data includes a speed of the vehicle, an acceleration of the vehicle, a steering angle of the vehicle, and a brake state of the vehicle.

In additional embodiments, the processor computes a vehicle weight of the vehicle; and a vehicle resistance force of the vehicle.

In additional embodiments, the processor computes a brake utilization factor of the trailer. The brake utilization factor is a function of certain parameters including the vehicle weight and the trailer weight.

In additional embodiments, the processor computes a vehicle weight of the vehicle, computes a combined weight of the trailer and the vehicle together, and subtracts the vehicle weight from the combined weight to compute the trailer weight.

In additional embodiments, the processor computes a trailer vertical axle load based on the trailer weight and on a vertical load on a tongue of the trailer. The trailer brake gain is based on an optimum trailer brake force that is proportional to the trailer vertical axle load and vehicle deceleration.

In additional embodiments, the processor computes a vehicle brake-force pressure constant and determines a vehicle braking force based on the vehicle brake-force pressure constant and a brake state of the vehicle.

In additional embodiments, the processor computes an actual trailer brake force, an optimum trailer brake force, and a brake utilization factor of the trailer. The brake utilization factor is the actual trailer brake force divided by the optimum trailer brake force.

In additional embodiments, the processor updates the trailer brake gain entirely and independently without manual input.

In a number of other embodiments, a vehicle includes a body configured to be coupled to a trailer having a trailer braking system. The vehicle includes a brake pedal and sensors that obtain sensor data for the vehicle, including a state of a brake pedal of the vehicle and deceleration of the vehicle. A processor is coupled with the sensors and, based on the sensor data, computes a trailer weight of the trailer and a trailer resistance force of the trailer. The processor automatically updates a trailer brake gain based on both the trailer weight and the trailer resistance force.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control unit or component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of automated driving systems including cruise control systems, automated driver assistance systems and autonomous driving systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
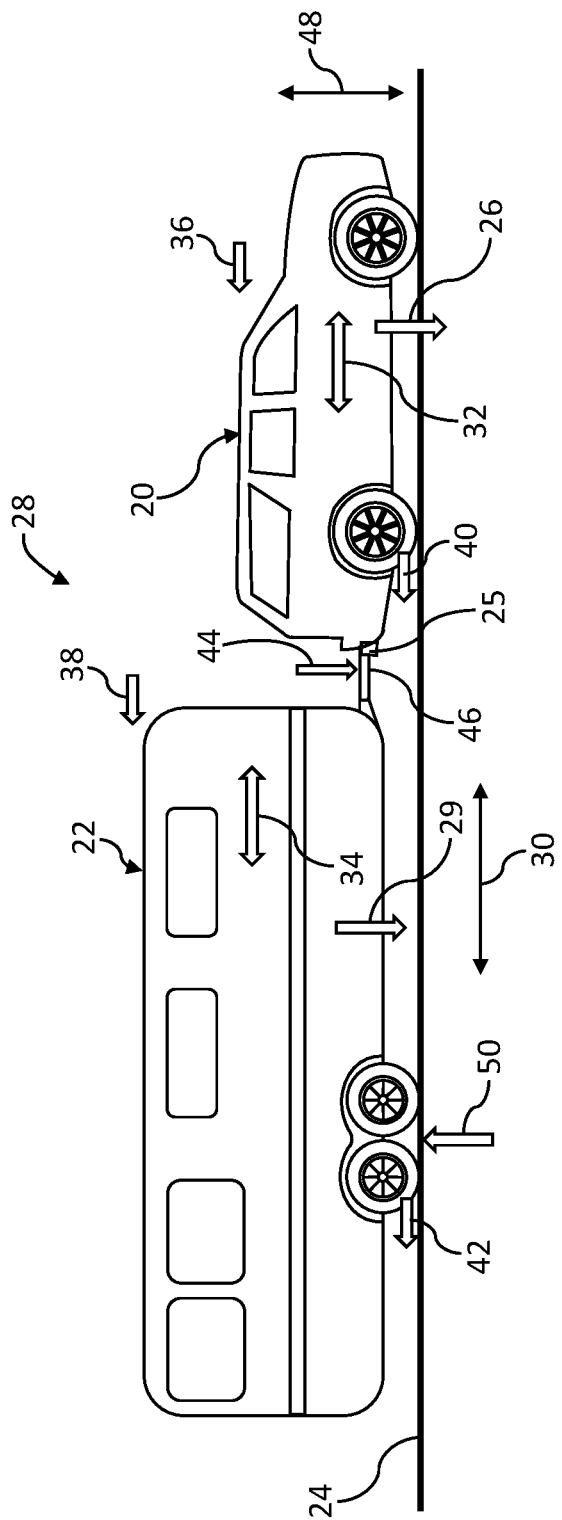
FIG. 1 is a schematic illustration of a vehicle-trailer system showing various parameters, in accordance with exemplary embodiments.

Referring to FIG. 1, a vehicle 20 towing a trailer 22 is illustrated travelling on a roadway 24. The trailer 22 may be releasably coupled with the vehicle 20 by a hitch 25 for travel over the roadway 24. The hitch 25 may be configured for any of various types of hitching, including ball-type, fifth-wheel, goose-neck, pintle, etc. As used herein, "vehicle" may refer to a host vehicle, such as the vehicle 20, that tows a towed vehicle "trailer," such as the trailer 22. The term tow-vehicle may also be used to refer to the vehicle 20 doing the towing. In embodiments, a motorized automobile may serve as the vehicle 20 towing the trailer 22 in a vehicle-trailer system 28.

The trailer 22 is illustrated for representation purposes and may be any mobile apparatus being towed by the vehicle 20, such as a boat trailer, a camping trailer, a utility trailer, a specialized type of mobile equipment, etc. When the vehicle-trailer system 28 operates on the roadway 24 various parameters may be used to describe the vehicle 20 and/or the trailer 22. The vehicle 20 has a weight ($W_V$) 26, and the trailer has a weight ($W_T$) 29. The vehicle 20 and the trailer 22 will have a common acceleration ($a_x$) value in the longitudinal direction (x) 30. The acceleration/$a_x$ may be an increasing acceleration, a zero acceleration, or a decreasing acceleration (deceleration). The inertia force ($F_{av}$) 32 of the moving vehicle 20 is its mass multiplied by its acceleration ($m_v a_x$). The inertia force ($F_{at}$) 34 of the moving trailer 22 is its mass multiplied by acceleration ($m_t a_x$). When moving, the vehicle 20 works against a resistance force ($F_{RV}$) 36, and the trailer 22 works against a resistance force ($F_{RT}$) 38. The resistance forces $F_{RV}$ and $F_{RT}$ may include components that account for aerodynamics/air resistance, rolling resistance, and resistance due to a gradient (slope) of the roadway 24. When the brakes are applied, the vehicle 20 experiences a braking force ($F_{BV}$) 40, and the trailer 22 experiences a braking force ($F_{BT}$) 42. The trailer 22 applies a trailer vertical force ($F_{ZT}$) 44 at its tongue 46 to the hitch 25 of the vehicle 20 in the vertical direction (z) 48. The trailer 22 has a trailer vertical axle load ($W_T - F_{ZT}$) 50. As further described below, these various parameters may be known values, may be determined, or may be estimated. The parameters may be used to evaluate/define various aspects of the vehicle 20 and/or of the trailer 22 and to make control determinations.

Figure 2:
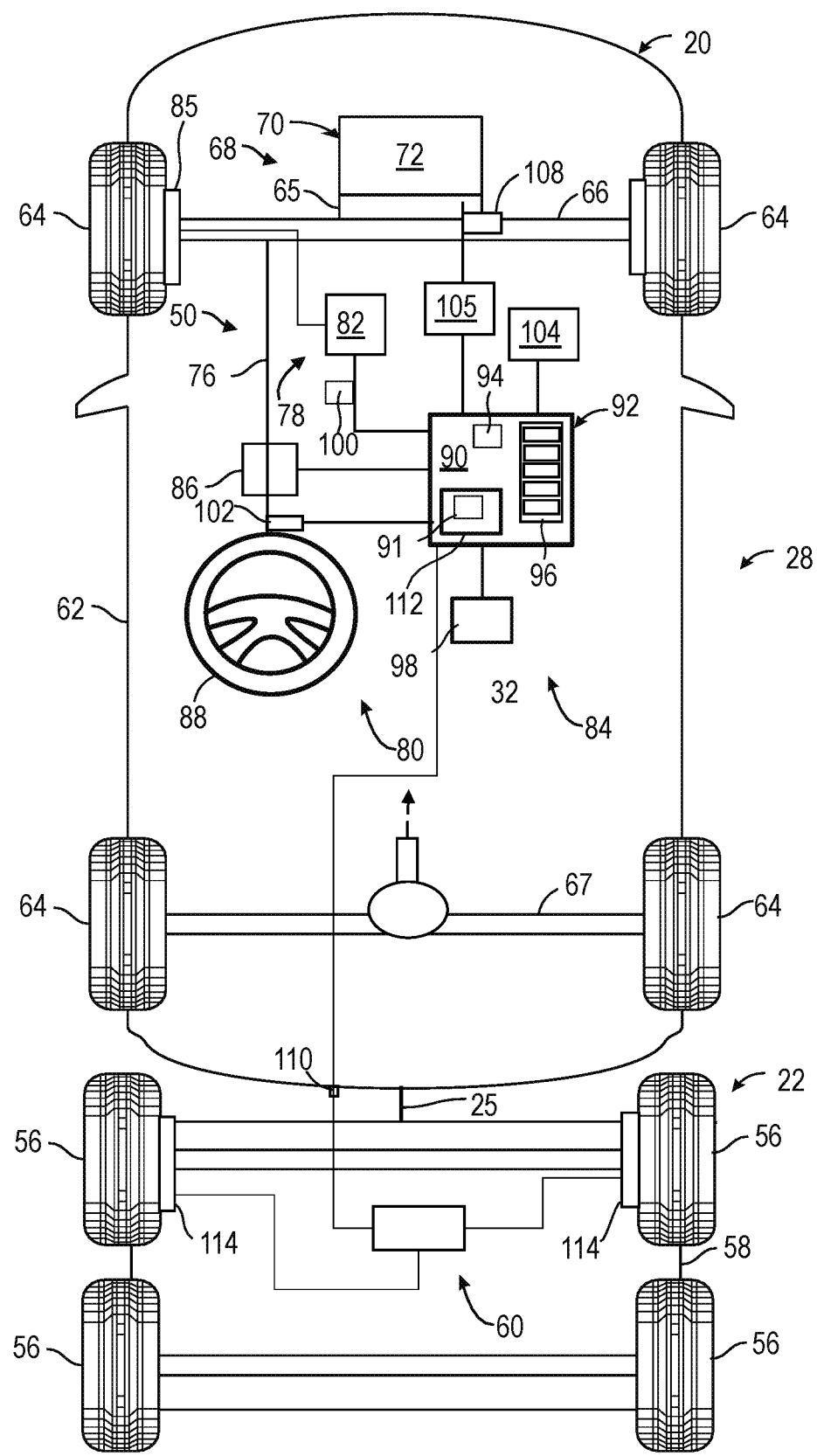
FIG. 2 is a functional block diagram of a vehicle-trailer system, in accordance with exemplary embodiments.

With reference to FIG. 2, certain features of the vehicle-trailer system 28 are illustrated in functional block diagram form. It will be appreciated that the vehicle 20 is adapted to operate as a tow-vehicle for towing a trailer, such as the trailer 22. In various embodiments, the vehicle 20 is an automobile. The vehicle 20 may be any one of a number of different types of automobiles, such as, for example, a sedan, a wagon, a van, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 20 may also include another type of mobile platform.

In various embodiments, the trailer 22 may include any number of different types of trailers and/or other types of mobile platforms, for example that are coupled to the vehicle 20 and move along with the vehicle 20. As depicted in FIG. 2, in various embodiments, the trailer 22 includes, among other features, a plurality of wheels 56, a body 58, and a braking system 60. While the trailer 22 is depicted as having four wheels 56, it will be appreciated that the number of wheels 56 may vary in different embodiments.

As depicted in FIG. 2, the vehicle 20 includes a body 62 that is arranged on or integrated with a chassis. The body 62 substantially encloses other components of the vehicle 20. The vehicle 20 also includes a plurality of wheels 64. The wheels 64 are each rotationally coupled to the chassis near a respective corner of the body 62 to facilitate movement of the vehicle 20. In one embodiment, the vehicle 20 includes four wheels 64, although this may vary in other embodiments (for example for trucks and certain other vehicles).

A drive system 68 is mounted in the vehicle 20, and drives the wheels 64, for example via axles 66, 67. In certain embodiments, the drive system 68 includes a propulsion system 70. In certain exemplary embodiments, the propulsion system 70 includes a powerplant 72, such as an internal combustion engine and/or an electric motor/generator, that is coupled with a transmission 65. In certain embodiments, the drive system 68 may vary, and/or two or more drive systems 68 may be used. By way of example, the vehicle 20 may also incorporate any one of, or combination of, a number of different types of propulsion systems 70, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 2, the vehicle 20 also includes a braking system 78 and a steering system 80 in various embodiments. In exemplary embodiments, the braking system 78 controls braking of the vehicle 20 using an actuator 82 that may be controlled via inputs provided by a driver, such as through a brake pedal as the actuator 82, and in certain embodiments, via automatic control by a control system 84. The braking system 78 incudes brakes, such as brake 85, at any of the number of wheels 64. Also in exemplary embodiments, the steering system 80 controls steering of the vehicle 20 via an actuator 86, such as with inputs from a steering wheel 88 (e.g., in connection with a steering column coupled to the axle 66 and/or the wheels 64), that are controlled via inputs provided by a driver, and in certain embodiments via automatic control via the control system 84.

In the embodiment depicted in FIG. 2, the control system 84 is coupled with various systems including the braking system 78 and the steering system 80 of the vehicle 20, as well as with the braking system 60 of the trailer 22. In various embodiments, the control system 84 may also be coupled to one or more other systems and/or components of the vehicle 20 and/or the trailer 22 and includes a controller 90 and a gain control module 91. As illustrated in FIG. 2, the controller 90 and the gain control module 91 are a part of, or comprise, a computer system 92. It will be appreciated that the controller 90 may otherwise differ from the example depicted in FIG. 2. The controller 90 may be configured as any number of controllers and/or microcontrollers in communication with each other. The gain control module 91 may be integrated with the controller 90, or may be separate from the controller 90 and may be coupled therewith and with the trailer braking system 60. In general, the gain control module 91 scales the signal sent to the trailer braking system 60 based on a parameters and values determined as described herein, to direct the trailer braking system 60 to brake the trailer 22 when the braking system 78 is operated to brake the vehicle 20.

As illustrated in FIG. 2, the controller 90 is coupled with various devices and systems of the vehicle 20, such as the braking system 78 and the steering system 80. The controller 90 may accept information from various sources, process that information, and provide control commands based thereon to effect outcomes such as operation of the vehicle 20 and its systems, including of the braking system 78. In the depicted embodiment, the controller 90 includes a processor 94 and a memory device 96, and is coupled with a storage device 98. The processor 94 performs the computation and control functions of the controller 90, and may be any type of processor or multiple processors, single integrated circuits such as a microprocessor, or any suitable number of integrated circuit devices and/or circuit boards working in cooperation to accomplish the functions of a processing unit. During operation, the processor 94 may execute one or more programs and may use data, each of which may be contained within the storage device 98 and as such, the processor 94 controls the general operation of the controller 90 in executing the processes described herein, such as the processes and methods described in greater detail below:

The memory device 96 may be any type of suitable memory. For example, the memory device 96 may include volatile and nonvolatile storage in read-only memory (ROM), random-access memory (RAM), and keep-alive memory (KAM), for example. KAM is a persistent or non-volatile memory that may be used to store various operating variables while the processor 94 is powered down. The memory device 96 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 90. In the depicted embodiment, the memory device 96 may store the above-referenced programs along with one or more stored values of the data such as for short-term data access.

The storage device 98 stores data, such as for long-term data access for use in automatically controlling the vehicle 20 and its systems. The storage device 98 may be any suitable type of storage apparatus, including direct access storage devices such as hard disk drives, flash systems, floppy disk drives and optical disk drives. The storage device 98 is a non-transitory computer readable medium configured to store programs and data, such as on parameters of the vehicle 20 and the trailer 22. In one exemplary embodiment, the storage device 98 is a source from which the memory device 96 receives the programs that execute one or more embodiments of one or more processes of the present disclosure. In another exemplary embodiment, the programs may be directly stored in and/or otherwise accessed by the memory device 96. The programs represent executable instructions, used by the controller 90 in processing information and in controlling the vehicle 20 and its systems, including the braking system 78. While the components of the control system 84 are depicted as being part of the same system, it will be appreciated that in certain embodiments these features may comprise multiple systems. In addition, in various embodiments the control system 84 may comprise all or part of, and/or may be coupled to, various other vehicle devices and systems, such as, among others, the propulsion system 70 and/or other systems of the vehicle 20.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 94) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system 92 of the controller 90 may also otherwise differ from the embodiment depicted in FIG. 2.

The controller 90 is coupled with various actuators including the actuators 82, 86 and the propulsion system 70. The controller 90 is also coupled with various sensors that sense observable conditions of the vehicle-trailer system 28. In this embodiment, the sensing devices include, but are not limited to, a braking sensor 100 such as a pedal position sensor, a steering angle sensor 102, an acceleration sensor, such as an inertial measurement unit (IMU) 104, and a torque request sensor 105, such as at the accelerator pedal or throttle. The IMU 104 may include accelerometers and gyroscopes, which may be in electronic form to provide motion, position, and navigational sensing over a number of degrees of freedom. For example, microelectromechanical system (MEMS) devices may be used to sense translation such as surge, heave and sway, and rotation such as roll, pitch and yaw.

In various embodiments, the braking sensor 100 is included in the braking system 78 of the vehicle 20, and measures an amount of braking relating thereto. In certain embodiments, the braking sensor 100 measures an amount of engagement thereof by a driver of the vehicle 20) (e.g., a measured amount of brake pedal travel and/or brake pedal force of the brake pedal and/or applied thereto based on engagement of the brake pedal by the driver). Also in various embodiments, the steering angle sensor 102 is included in the steering system 80 of the vehicle 20, and measures an indication of steering relating thereto. In certain embodiments, the steering angle sensor 102 measures an angle of the steering wheel 88 resulting from engagement of the steering wheel 88 by the driver. In various embodiments, a speed sensor 108 measures an amount of speed (and/or changes thereof) of the vehicle 20. In certain embodiments, the speed sensor 108 is a rotational speed sensor monitoring the driveline of the vehicle 20. In various embodiments, the IMU 104 measures inertial measurement data and/or related parameters of the vehicle 20, which may include acceleration and a grade or slope of the roadway 24 on which the vehicle 20 is travelling.

In various embodiments, the controller 90 is coupled to, among other devices, the sensors, the braking system 78 of the vehicle 20, and the braking system 60 of the trailer 22. For example, the trailer 22 may be electrically coupled with the vehicle 20 through a connector 110, such as a multi-pin electrical connector. In certain embodiments, the controller 90 may also be coupled with the steering system 80, the propulsion system 70, and/or one or more other systems, devices, and/or components of the vehicle 20 and/or the trailer 22. In various embodiments, the controller 90 receives sensor data, processes the sensor data, and controls braking of the vehicle 20 and of the trailer 22 (via the vehicle braking system 78 and the trailer braking system 60, respectively), based on the processing of the sensor data, such as described further below. The controller 90 may provide the gain control functions of the vehicle-trailer system 28. In embodiments, a gain controller 112 may be coupled in the control system 84 and in certain embodiments may be included in the controller 90. In embodiments, the gain control module 91 may reside in, or may comprise, the gain controller 112. The gain controller 112 may provide the function of controlling the intensity of the braking signal sent to the braking system 60) of the trailer 22, such as from the controller 90 and/or the gain control module 91. The gain controller 112 and/or the gain control module 91 is/are configured to vary the signal intensity (gain level) as further described below. The braking system 60 of the trailer 22 responds to the braking signal to apply the brakes 114 in proportion to the signal's intensity. Accordingly, the gain controller 112/gain control module 91 controls the relative force with which the brakes 114 are applied in relation to the application of the brakes 85 of the vehicle 20. The signal intensity (gain) may be adjusted as further described below. In embodiments, the gain controller 112/gain control module 91 may include no operator/driver interface. In embodiments, a data information center (not shown) of the vehicle 20 may include a display of gain setting information for driver reference purposes only.

While certain parameters of the vehicle-trailer system 28 may be directly measured, such as the extent of brake actuation via the braking sensor 100, the steering angle via the steering angle sensor 102 and acceleration via the IMU 104, others may be derived or estimated. For example, the mass of the vehicle 20 and trailer 22 and the resistance force of the vehicle 20 and the trailer 22 may be computed by the controller 90 as further described below.

Figure 3:
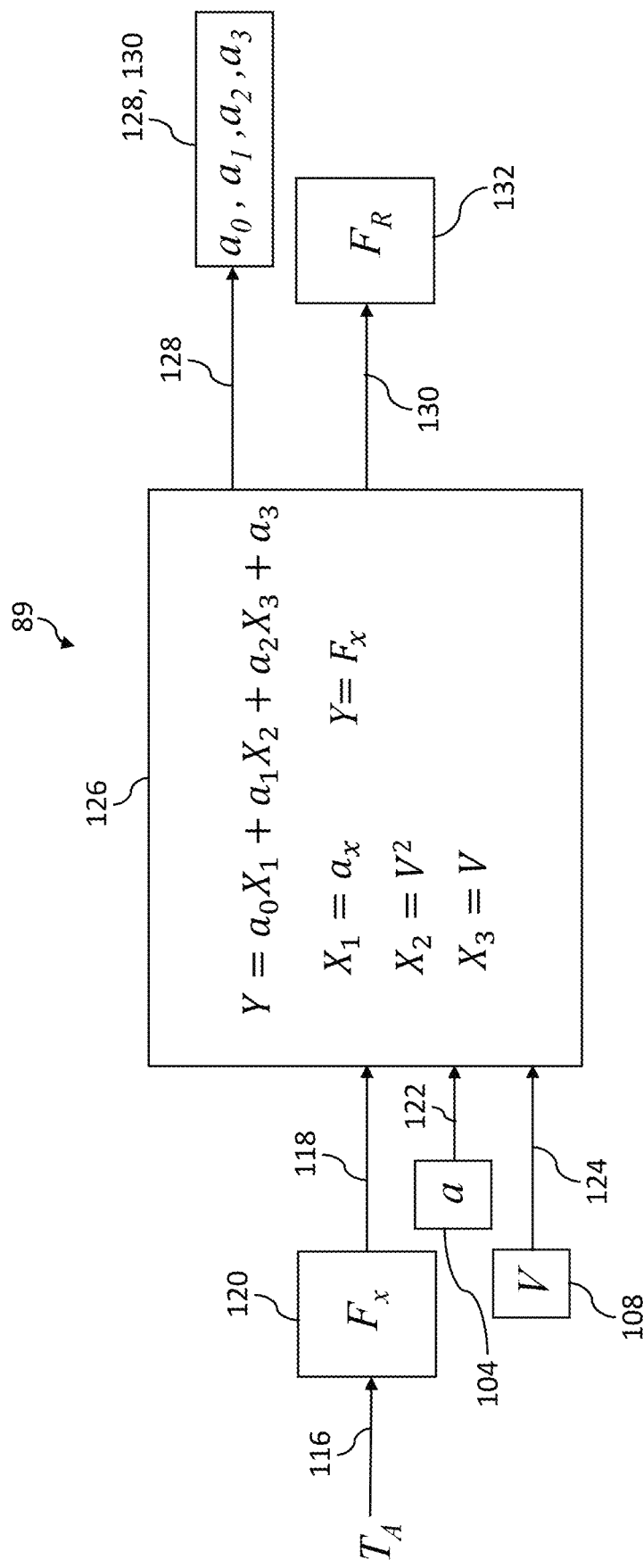
FIG. 3 is a functional block diagram of a system for determining parameters of the vehicle-trailer system of FIG. 2, in accordance with exemplary embodiments.

Referring additionally to FIG. 3, a system 89 for determining certain parameters of the vehicle 20 and/or the trailer 22 is illustrated. The system 89 may be operated by the controller 90, such as by the gain control module 91, or another module. In operation of the propulsion system 70, the controller 90 generates a torque signal, such as in response to the application of the accelerator pedal as sensed by the torque request sensor 105, to propel the vehicle 20 via the powerplant 72, and may be set by the controller 90 as a function of the particular operating conditions of the vehicle 20. The torque signal or axle torque ($T_A$) 116 is therefore a known value from the controller's 90 operation of the propulsion system 70. The controller 90, and specifically the processor 94 may compute a tractive force ($F_x$) 118 of the vehicle 20 via a tractive force module 120, such as by using the equation $$F_x = \frac{1}{R} T_A,$$

where R is the radius of the wheels 64. The tractive force ($F_x$) 118 may be stored, such as in the storage device 98. Acceleration of the vehicle 20 or of the vehicle-trailer system 28 may be received by, or determined by, the controller 90 using a signal 122 from the IMU 104, or from another acceleration sensor of the vehicle 20. Speed of the vehicle 20 may be received by, or determined by, the controller 90 using a signal 124 from the speed sensor 108. The processor 94 may, via an identifier module 126, compute resistance force coefficients ($a_1$, $a_2$, $a_3$) 128 and mass ($a_0$) 130 of the vehicle 20. These values may be computed for the vehicle 20 and separately for the trailer 22 using a similar approach. With the resistance force coefficients ($a_1$, $a_2$, $a_3$) 128 and mass ($a_0$) 130 determined, the resistance force ($F_R$) may be computed by a resistance force module 132 and may be stored, such as in the storage device 98.

Figure 4:
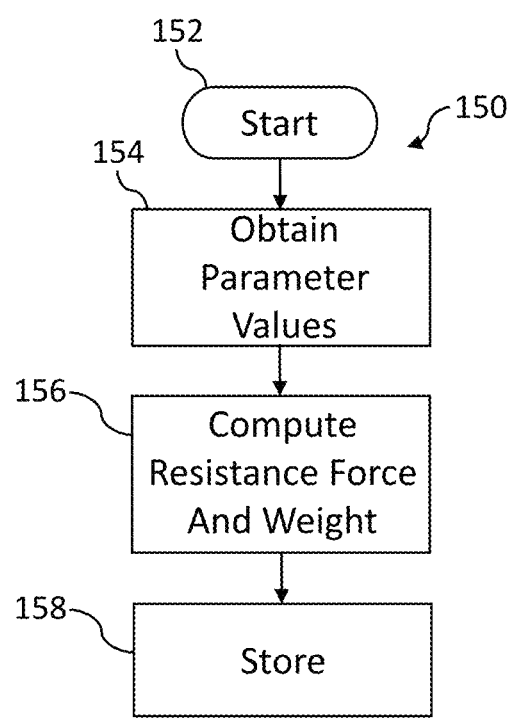
FIG. 4 is a flowchart of process for computing determining parameters of the vehicle-trailer system of FIG. 2, in accordance with exemplary embodiments, and that may be used in the process of FIG. 6.

Referring to FIG. 4, the parameters including the resistance force coefficients/$a_1$, $a_2$, $a_3$ 128, and the mass/$a_0$ 130 may be computed according to a method 150. As will be appreciated in light of the disclosure, the order of operation within the method 150 is not limited to the sequential execution as illustrated in FIG. 4, but may be performed in one or more varying orders as applicable and in accordance with the present disclosure. In various embodiments, the method 150 starts 152 and may be scheduled to run based on one or more predetermined events, and/or may run continuously during operation of the vehicle 20. In the method 200, available parameter values are obtained 154 by the processor 94. For example, acceleration/$a_x$, velocity (V), and tractive force/$F_x$ 118 may be obtained from sensor inputs and/or memory.

Certain parameters of the vehicle 20, and/or the trailer 22, and/or of the vehicle-trailer system 28 may next be determined. The resistance force/$F_R$ and the weight/W may be computed 156. In general, mass multiplied by acceleration plus resistance equals tractive force/$F_x$ 118, which may be available from the tractive force module 120. The relationship may be represented by the equation: $F_x = a_0 a_x + a_1 V^2 + a_2 V + a_3$, from which the resistance force coefficients/$a_1$, $a_2$, $a_3$ 128 and the mass/do 130 may be computed, such as by the processor 94. Acceleration/$a_x$ and velocity/V are known from sensed values. The computation 156, such as by the identifier module 126, may use an identification method such as least squares, or may employ another type of algorithm for parameter identification. The computation 156 may use the quadratic form: $Y = a_0 X_1 + a_1 X_2 + a_2 X + a_3$, where Y is tractive force/$F_x$ 118, $X_1$ is acceleration/$a_x$, $X_2$ is velocity squared ($V^2$), and $X_3$ is velocity/V. Using the selected identification method, the quadratic form may be solved to find the resistance force coefficients/$a_1$, $a_2$, $a_3$ 128 and the mass/$a_0$ 130 of the vehicle 20. Resistance force/$F_R$ may be computed using: $F_R = a_1 V^2 + a_2 V + a_3$ and employing the computed 156 resistance force coefficients/$a_1$, $a_2$, $a_3$ 128 and the measured velocity/V. Since force is equal to mass multiplied by acceleration and weight is equal to mass over the acceleration of gravity (g), weight/$W_v$ 26 of the vehicle 20 may be computed 156 using $$W\left(\frac{a_x}{g}\right) + F_R = F_x.$$

The computed 156 weight/$W_v$ 26 may be stored 158, such as in the storage device 98. Similarly, using the method 150, the resistance force of the trailer/$F_{RT}$ 38 and the weight of the trailer/$W_t$ 29 may be computed 156, 160 by computing 156, 160 the parameters of the vehicle-trailer system 28 and subtracting the values computed 156, 160 for the vehicle 20 alone. Through the method 150, the computed 156 resistance force/$F_{RV}$ 36 and the computed weight/$W_v$ 26 are stored 158, such as in the storage device 98.

Figure 5:
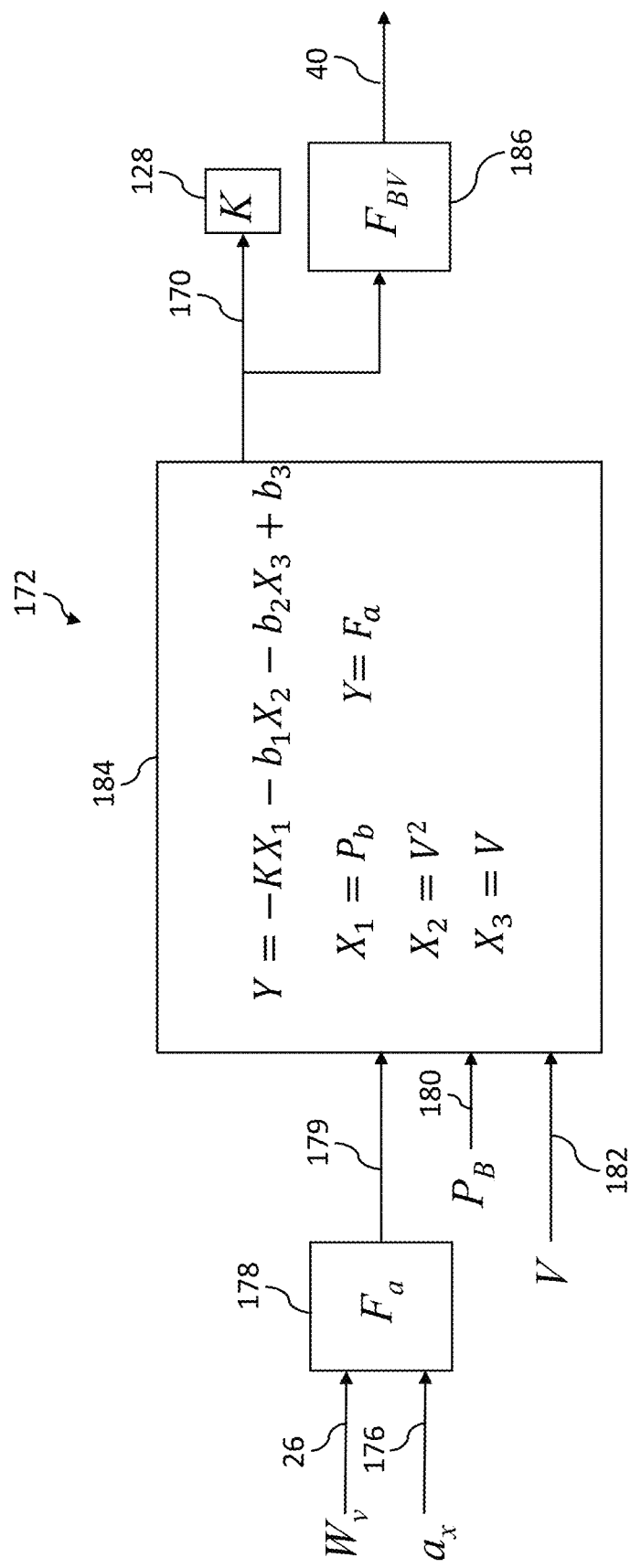
FIG. 5 is a functional block diagram of a system for determining parameters of the vehicle-trailer system of FIG. 2, in accordance with exemplary embodiments.

Referring to FIG. 5, during a braking event of the vehicle 20 operating alone, the determination of a brake-force pressure constant (K) 170 and a brake force (FBI) 40 is illustrated as performed by system 172. Weight/$W_v$ 26 of the vehicle is available, such as from the method 150, and deceleration/$a_x$ 176 may be obtained using signals from the IMU 104. An inertia force module 178 may compute inertia force ($F_a$) 179 using:

$$F_a = W_v \frac{a_x}{g}.$$

The values for $W_v$ and g may be obtained, such as being referenced by the processor 94 from the storage device 98. In addition, brake pressure ($P_B$) 180 and vehicle speed/V may be obtained, such as by using signals from the braking sensor 100 and the vehicle speed sensor 108. The inertia force/$F_a$ 179 is equal to $-F_{BV} - F_{RV}$. The inertia force/$F_a$ 179 may also be defined in the following equation: $F_a = -KP_B - b_1 V^2 - b_2 V - b_3$, where K is a brake-force pressure constant (K) 170 and $b_1$, $b_2$, $b_3$ are resistance force coefficients. Braking force/$F_{BV}$ 40 is equal to $-KP_B$. Resistance force/$F_{RV}$ 36 may be equated as follows: $F_{RV} = -b_1 V^2 - b_2 V - b_3$. The processor 94 may, via an identifier module 184, compute the resistance force coefficients/$b_1$, $b_2$, $b_3$ 128, and brake-force pressure constant/K 170 of the vehicle 20. Using the brake-force pressure constant/K and the resistance force coefficients/$b_1$, $b_2$, $b_3$, a brake force module 186 may compute the braking force/$F_{BV}$ 40. The values for K and FBI may be stored, such as in the storage device 98.

Figure 6:
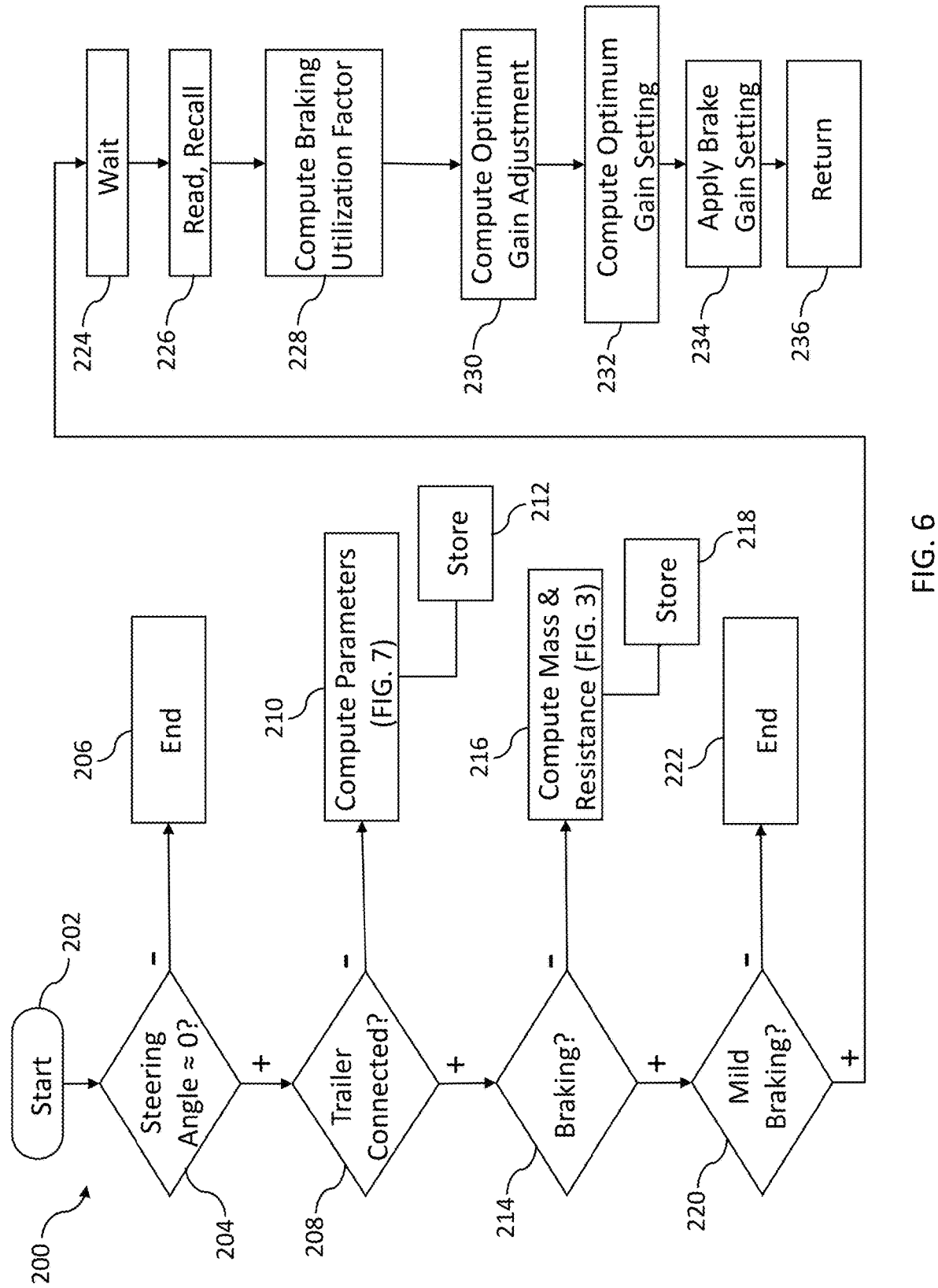
FIG. 6 is a flowchart of process for computing and applying trailer brake gain for the vehicle-trailer system of FIG. 2, in accordance with exemplary embodiments.

Referring to FIG. 6, a method 200 for scaling trailer brake gain is illustrated in flow chart form. The order of operation within the method 200 is not limited to the sequential execution as illustrated in FIG. 6, but may be performed in one or more varying orders as applicable and in accordance with the present disclosure. In various embodiments, the method 200 starts 202 and may be scheduled to run based on one or more predetermined events, such as when the vehicle 20 is operating on the roadway 24, and/or may run continuously during operation of the vehicle 20. A determination 204 is made as to whether the vehicle 20 is driving in a substantially straight line. For example, using input from the steering angle sensor 102, the processor 94 may compare the sensed steering angle ($\delta$) to a substantially straight steering angle ($\delta_0$). For example, the determination 204 may be whether $/\delta/ < \delta_0$. Absolute value is used to cover both left and right turning scenarios. Substantially straight may, for example, mean the steering is approximately straight, e.g., within ±5° of straight. For example, the determination 204 may be whether the absolute value of the steering angle is below a threshold, such as five-degrees, or another value such as ten-degrees or less. When the determination 204 is negative, meaning the vehicle 20 is not operating in a substantially straight line, the method 200 ends 206 and no trailer gain scaling changes are made.

When the determination 204 is positive, meaning the vehicle 20 is operating in a substantially straight line, the method 200 proceeds to a determination 208 as to whether the trailer 22 is connected to the vehicle, such as may be indicated by sensing a coupling of the connector 110. When the determination 204 is negative, meaning the trailer 22 is not connected and the vehicle 20 is operating on its own, the method 200 proceeds to compute 210 certain parameters of the vehicle 20.

Figure 7:
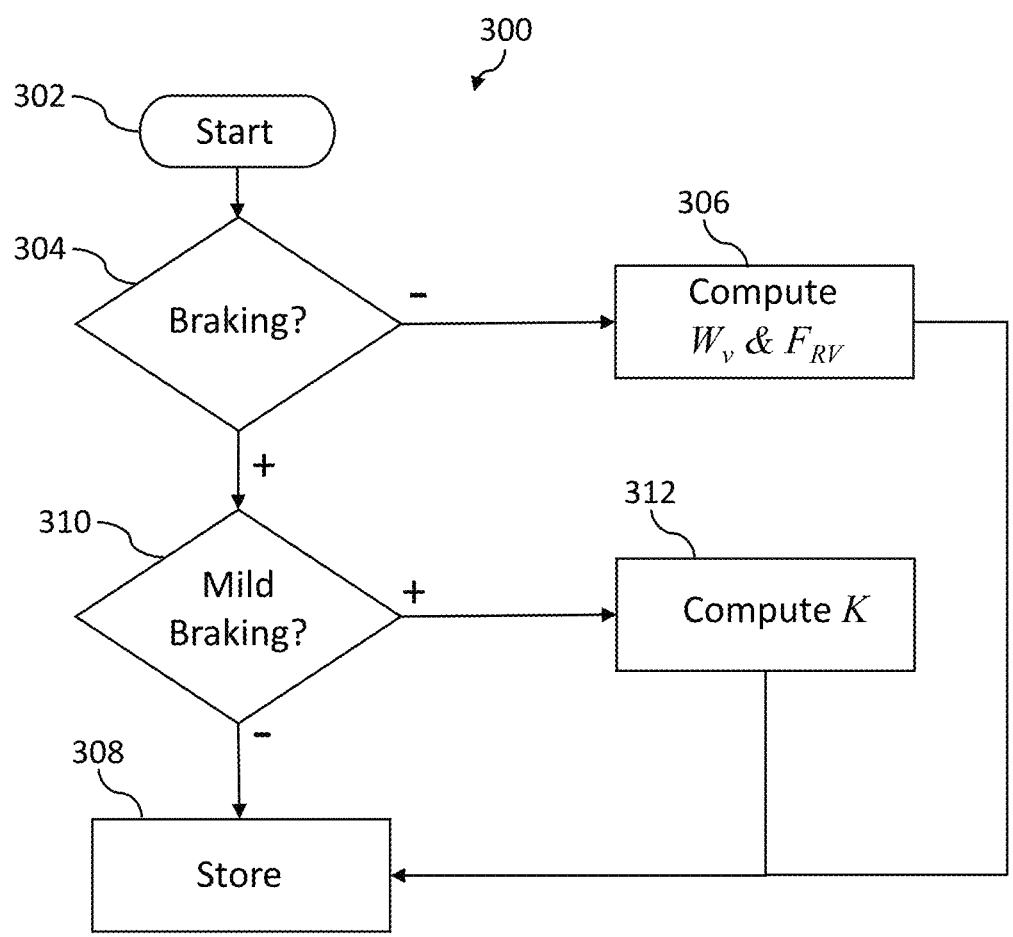
FIG. 7 is a flowchart of process for computing determining parameters of the vehicle-trailer system of FIG. 2, in accordance with exemplary embodiments, and that can be implemented in connection with the process of FIG. 6.

In embodiments, computing 210 the parameters of the vehicle 20 may be carried out as illustrated in FIG. 7. Referring to FIG. 7, computing 210 the parameters includes a method 300, which starts 302 when the determination 208 is negative (trailer 22 not connected). The method 300 may be a part of the method 200, and may be an integral part or a subroutine thereof, and may be started 302 when the vehicle 20 is operating without the trailer 22 as indicated by the determination 208. Following the start 302 of the method 300, a determination 304 is made as to whether the vehicle 20 is in a braking event. For example, the determination 304 may be whether the vehicle 20 is decelerating/$a_x$ at a rate of greater deceleration than (less than), a threshold amount ($a_b$). For example, the determination may include an evaluation by the processor 94 as to whether $a_x < a_b$. The threshold amount/$a_b$ may be referenced, such as from the storage device 98, and may be set such that it provides an indication that the vehicle 20 is in a braking event and not just coasting. The threshold amount/$a_b$ may be determined and set using modelling and/or testing. When the determination 304 is negative, meaning the vehicle 20 is not in a braking event, the method 300 proceeds to compute 306 the resistance force/$F_{RV}$ 36 and the weight/$W_v$ 26 of the vehicle 20. For example, using the method 150 of FIG. 4, the resistance force/$F_{RV}$ 36 and the weight/$W_v$ 26 of the vehicle 20 may be computed 306. The resistance force/$F_{RV}$ 36 and the weight/$W_v$ 26 of the vehicle 20 are stored 308, such as in the storage device 98.

Continuing with the method 300, when the determination 304 is positive, meaning the vehicle 20 is in a braking event, such as by $a_x$ being less than $a_b$, the method determines 310 whether the braking event is mild. For example, the determination 310 may evaluate whether $a_x > a_{max}$ and $V_{min} < V < V_{max}$. What this means is that the deceleration/$a_x$ of the vehicle does not surpass a threshold deceleration $A_{max}$ and the velocity/V of the vehicle 20 is between a minimum speed ($V_{min}$) and a maximum speed ($V_{max}$). The values for $a_{max}$, $V_{min}$ and $V_{max}$ may be determined using modelling and/or testing and are set at levels to avoid extreme conditions ensuring that the braking event is mild, meaning it is a routine braking event of the vehicle 20 where neither speed nor deceleration is above a normal operational level for the vehicle 20. When the determination 310 is negative, meaning the braking event is not mild, the method 300 returns to start 302 and/or waits to be retriggered by the method 200.

When the determination 310 is positive, meaning the braking event is mild, the method 300 proceeds to compute 312 the brake-force pressure constant/K 170 of the vehicle 20 and the braking force/$F_{BV}$ 40 of the vehicle 20, such as using the system 172. The computation 312, such as by the identifier module 184, may use an identification method, such as least squares, or another type of algorithm for parameter identification. The computation 312 may use the quadratic form: $Y = -KX_1 - b_1X_2 - ab_2X_3 + b_3$, where Y is the inertia force/$F_a$ 179, $X_1$ is brake pedal force ($P_b$), $X_2$ is velocity squared/$V^2$, and $X_3$ is velocity/V. Using the identification method, the quadratic form may be solved to find the resistance force coefficients ($b_1$, $b_2$, $b_3$) and the brake-force pressure constant (K) 170. Using K, the brake force ($F_{BV}$) may be computed 312 using: $F_{BV} = KP_b$. The computed 312 brake-force pressure constant/K 170) and brake force/$F_{BV}$ are stored 308, such as in the storage device 98.

Returning to the method 200 of FIG. 6, the computed 210 (such as computed via the method 300), values may be stored 212, such as in the storage device 98. When the determination 208 is positive, meaning the trailer 22 is connected to the vehicle 20, the method 200 proceeds to determine 214 whether the vehicle-trailer system 28 is operation in a braking event. For example, the determination 214 may be whether the vehicle-trailer system 28 is decelerating/$a_x$ at a rate greater than the threshold amount/$a_b$. For example, the determination may include an evaluation by the processor 94 as to whether $a_x < a_b$. The threshold amount/$a_b$ may be referenced from storage, such as from the storage device 98, and may be set such that it provides an indication that the vehicle-trailer system 28 is in a braking event and not just coasting. The threshold amount/$a_b$ for the vehicle-trailer system 28 may be determined and set using modelling and/or testing. When the determination 214 is negative, meaning the vehicle-trailer system 28 is not in a braking event, the method 200 proceeds to compute 216 the resistance force of the vehicle+trailer 20, 22 ($F_{RVT}$) and the weight of the vehicle 20+trailer 22 ($W_{vt}$) such as by using the system 89 of FIG. 3 and/or the method 150 of FIG. 4. The weight of the trailer 22 ($W_t$) 29 and the resistance force of the trailer 22 ($F_{RT}$) 38 may be computed 216 by solving for the parameters of the vehicle-trailer system 28 and subtracting the stored values for the vehicle 20 alone. The computed 216 values ($W_t$, $F_{RT}$) may be stored 218, such as in the storage device 98.

When the determination 214 is positive, meaning the vehicle-trailer system 28 is in a braking event, the method 200 proceeds to determine 220, such as by the processor 94, whether the braking event is mild. Similar to the approach described in relation to method 300, the method 200 determines 220 whether the braking event is mild. For example, the determination 220 may evaluate whether $a_x > a_{max}$ and whether $V_{min} < V < V_{max}$. Again, this means that the deceleration/$a_x$ of the vehicle-trailer system 28 does not surpass a threshold deceleration $a_{max}$ and the velocity of the vehicle-trailer system 28 is between a minimum speed and a maximum speed. When the determination 220 is negative, meaning the deceleration is greater than a maximum deceleration or the speed is not within the minimum to maximum range, the method 200 stops 222 and no trailer brake gain scaling adjustments are made.

When the determination 220 is positive, meaning the deceleration is less than a maximum deceleration and the speed of the vehicle-trailer system 28 is within the minimum-to-maximum range, the method 200 proceeds to wait 224 for a time ($T_d$) for the trailer brakes to complete any transient response (i.e. to reach a steady state condition). The length of $T_d$ may be predetermined and stored, such as in the storage device 98, and may be referenced by the processor 94. Following the waiting 224, the method 200 proceeds to read 226 data and certain parameters which may have been previously stored, such as in the storage device 98, or which may be determined from the various sensors. The method 200 then computes 228, such as via the processor 94, a braking utilization factor ($U_B$). The maximum braking of the trailer 22 that may be applied without wheel 56 lockup is a function of certain physical parameters including vertical load and friction. At the maximum braking force that may be applied by the brakes 114 of the trailer 22 without lockup of the wheels 56, the utilization factor/$U_B$ is 100%. In other word, all of the available braking force is used when $U_B$=100%. The 100% utilization factor maximizes the trailer brake performance and minimize the stopping distance, however it puts the tires at the edge of locking, therefore the utilization factor optimum value ($U_{B-opt}$) for is $U_B$ is set at a value less than 100%, such as 80-90% (0.8-0.9), and in the current embodiment is 80%. In other embodiments, the optimum $U_B$ value may be set based on the desired performance of the trailer braking system and may vary from 80%.

The optimum trailer brake force ($F_{Bt-opt.}$) is proportional to trailer vertical axle load ($W_t - F_{zt}$), which may be estimated as described below; and deceleration/$a_x$, which is measurable. Specifically, the optimum trailer brake force may be determined using.

$$F_{Bt-opt.} = -(W_t - F_{zt})\left(\frac{a_x}{g}\right).$$

Actual trailer brake force may be determined using: trailer+vehicle weight ($W_t + W_v$), vehicle braking force ($F_{BV} = KP_B$), trailer+vehicle resistance force/$F_{RT}$, and vehicle deceleration/$a_x$. The trailer braking utilization factor/$U_B$ may be determined using actual trailer brake force ($F_{Bt}$), and optimal trailer brake force ($F_{Bt-opt}$). Specifically, $U_B = F_{Bt}/F_{Bt-opt}$.

To compute 228 $U_B$, the processor 94 may use the following utilization factor equation:

$$U_B = \frac{1 + \frac{W_v}{W_t}}{1 - C_t} + \frac{\frac{KP_B}{W_t} + \frac{F_{RT}}{W_t}}{1 - C_t}\frac{g}{a_x},$$

where $C_t$ is a tongue rate ratio of the trailer 22. The tongue rate ratio $C_t$ is not a static value but varies during driving, such as due to braking, load shifts, road changes, etc., and is the vertical force on the tongue 46 of the trailer 22 over the weight 29 of the trailer 22, or: $F_{zt}/W_t$. The other components of the utilization factor equation are defined above. The tongue rate ratio $C_t$ may be determined through modelling and calculation to be a value that is approximately 10%-15% during braking. In the current embodiment, the computing 228 uses an approximation of 0.15 for the tongue rate ratio $C_t$. Using this nominal value for the tongue rate ratio $C_t$ has been found to deliver accurate results and avoids the need to add sensors to measure the force $Z_{zt}$, providing an implementation benefit. As described above, the weight 26 of the vehicle 20 is determined. The weight 29 of the trailer 22 $W_t$ may be determining using the same approach for the vehicle-trailer system 28 and by subtracting $W_v$. Accordingly, $W_t$ may be determined. K, $P_B$ and $F_{RT}$ may also be determined as described above. The value of $a_x$ is a sensed value, the value of g is a known constant, and the value of $C_t$ is the nominal 0.15. Accordingly, $U_B$ may be computed 228.

The computed 228 $U_B$ is for 100% utilization the optimum value for is $U_B$ is set at a value less than 100%, and in the current embodiment is 80%. and as noted above. To maximize trailer braking while including a margin from wheel lockup, the utilization factor may be set below: 100%, such as in a range where $U_B$=80%-90%. The method 200 computes 230, such as via the processor 94, an optimum gain change $\Delta G_{opt.}$ that is the amount that the gain is to be changed (scaled) to set the gain at a current optimal level. The method 200 proceeds to compute 230, such as by the processor 94, the amount that the gain will be adjusted using: $\Delta G_{opt.} = K_g(U_{B-opt} - U_B)$, where $U_B$ is the computed 228 value, and $U_{B-opt}$ is, for example, approximately 80% (0.8) to 90% (0.9), and is 0.8 in the current embodiment so that $\Delta G_{opt.} = K_g(0.8 - U_B)$. $K_g$ is a constant that adjusts the error to a scale consistent with the gain settings of the gain controller 112. For example, the gain setting may be in a range of 1-10 units and the trailer forces may be in the range of hundreds of Newtons or more than a thousand newtons. $K_g$ is determined during the calibration phase of the control system 84 and may be set as a constant used for all trailers coupled with the vehicle 20. The constant may be determined by modelling and/or testing. Setting the constant at too high of a value may result in excessive swings in the gain setting and setting the constant too low may lead to an excessive number of iterations to eliminate the error. Accordingly, the constant is set, via calibration, to result in error elimination during one or two gain adjustment iterations. The $\Delta G_{opt.}$ value that is computed 230 may be saved, such as in the storage device 98.

The method 200 proceeds to set the updated gain value. The gain control module 91 will have a previous gain setting ($G_{opt.-old}$) that is in use. The processor 94 may reference the previous gain setting, such as from the storage device 98 or from the gain control module 91. The processor 94 may also reference the computed 230 $\Delta G_{opt.}$ value, such as from the storage device 98. The new optimum gain setting ($G_{opt.}$) may be computed 232, such as by the processor 94, using: $G_{opt.} = \Delta G_{opt.} + G_{opt.-old}$. The $G_{opt}$ that is computed 232 is applied 234 to the gain control module 91 for use in additional braking events. When the braking system 78 of the vehicle 20 is operated, such as by the actuator 82/brake pedal, the controller 90 sends a signal such as through the gain control module 91, to the braking system 60 of the trailer for operation of the brakes 114 using the $G_{opt.}$ value. The automatically computed 232 gain is used with no post setting testing and no driver/operator involvement or interaction. Accordingly, the gain scaling and setting is transparent to the human driver and is completed with the driver undertaking normal driving activities with no special maneuvers or braking needed. Specifically, the driver does not need to activate the brakes to test the gain setting. In addition, the optimum gain is continuously set with no need for additional hardware in a vehicle 20, using only speed, acceleration, steering angle and brake actuation sensors. As such, the braking systems 78, 60 reacts to changing road and/or load conditions automatically to set and use the optimum gain. The method 200 returns 236 to start 202 and may be scheduled to run continuously to continuously update the gain setting. In embodiments, the method 200 may be scheduled to run on a timed routine with a delay between gain updates, such as to reduce the use of computational resources.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for scaling a trailer brake gain of a trailer having trailer brakes and towed by a vehicle having vehicle brakes, the method comprising:
   obtaining sensor data via one or more sensors of the vehicle;
   computing, by a processor and based on the sensor data, a trailer weight of the trailer;
   computing, by the processor and based on the sensor data, a trailer resistance force of the trailer;
   computing a vehicle brake-force pressure constant;
   determining a vehicle braking force based on the vehicle brake-force pressure constant and a brake state of the vehicle;
   updating, automatically by the processor, the trailer brake gain based on the vehicle braking force, the trailer weight and the trailer resistance force; and
   applying, using the updated trailer brake gain, the trailer brakes in response to an application of the vehicle brakes.

2. The method of claim 1, wherein the sensor data includes a speed of the vehicle, an acceleration of the vehicle, a steering angle of the vehicle, and a brake state of the vehicle.

3. The method of claim 1, comprising:
   computing, by the processor, a vehicle weight of the vehicle; and
   computing, by the processor, a vehicle resistance force of the vehicle.

4. The method of claim 1, comprising computing a brake utilization factor of the trailer, wherein the brake utilization factor is a function of certain parameters including a vehicle weight of the vehicle and the trailer weight.

5. The method of claim 1, wherein computing the trailer weight includes computing a vehicle weight of the vehicle, computing a combined weight of the trailer and the vehicle together, and subtracting the vehicle weight from the combined weight.

6. The method of claim 1, comprising:
   computing, by the processor, a trailer vertical axle load based on the trailer weight and on a vertical load on a tongue of the trailer; and
   computing, by the processor, the trailer brake gain based on an optimum trailer brake force that is proportional to the trailer vertical axle load and vehicle deceleration.

7. The method of claim 1, comprising:
   computing, based on the vehicle braking force and the trailer resistance force, an actual trailer brake force;
   computing, based on the actual trailer brake force, a brake utilization factor of the trailer; and
   limiting the brake utilization factor to less than one-hundred percent utilization in determining the gain for braking the trailer to avoid wheel locking.

8. The method of claim 1, comprising:
   computing an actual trailer brake force;
   computing an optimum trailer brake force; and
   computing a brake utilization factor of the trailer, wherein the brake utilization factor is the actual trailer brake force divided by the optimum trailer brake force.

9. The method of claim 1, wherein the updating is accomplished entirely and independently by the processor without manual input.

10. The method of claim 1, comprising computing, by an identifier module, the trailer resistance force using an identification method.

11. A system for scaling a trailer brake gain of a trailer having trailer brakes and towed by a vehicle having vehicle brakes, the system comprising:
    sensors of the vehicle configured to provide sensor data; and
    a processor configured to:
       compute, based on the sensor data, a trailer weight of the trailer;
       compute a vehicle brake-force pressure constant;
       determine a vehicle braking force based on the vehicle brake-force pressure constant and a brake state of the vehicle;
       compute, based on the sensor data, a trailer resistance force of the trailer;
       automatically update the trailer brake gain based on the vehicle braking force, the trailer weight and the trailer resistance force; and
       apply, using the updated trailer brake gain, the trailer brakes in response to an application of the vehicle brakes.

12. The system of claim 11, wherein the sensor data includes a speed of the vehicle, an acceleration of the vehicle, a steering angle of the vehicle, and a brake state of the vehicle.

13. The system of claim 11, wherein the processor is configured to:
    compute a vehicle weight of the vehicle; and
    compute a vehicle resistance force of the vehicle.

14. The system of claim 11, wherein the processor is configured to compute a brake utilization factor of the trailer, wherein the brake utilization factor is a function of certain parameters including a vehicle weight of the vehicle and the trailer weight.

15. The system of claim 11, wherein the processor is configured to compute a vehicle weight of the vehicle, compute a combined weight of the trailer and the vehicle together, and subtract the vehicle weight from the combined weight to compute the trailer weight.

16. The system of claim 11, wherein the processor is configured to compute a trailer vertical axle load based on the trailer weight and on a vertical load on a tongue of the trailer, wherein the trailer brake gain is based on an optimum trailer brake force that is proportional to the trailer vertical axle load and vehicle deceleration.

17. The system of claim 11, wherein the processor is configured to:
    compute, based on the vehicle braking force and the trailer resistance force, an actual trailer brake force; and
    compute, based on the actual trailer brake force, a brake utilization factor of the trailer,
    wherein the brake utilization factor is limited to less than one-hundred percent utilization in determining the trailer brake gain for braking the trailer.

18. The system of claim 11, wherein the processor is configured to:
    compute an actual trailer brake force;
    compute an optimum trailer brake force; and
    compute a brake utilization factor of the trailer, wherein the brake utilization factor is the actual trailer brake force divided by the optimum trailer brake force.

19. The system of claim 11, wherein the processor is configured to update the trailer brake gain entirely and independently without manual input.

20. A vehicle having vehicle brakes comprising:
a body configured to be coupled to a trailer having a trailer braking system that includes trailer brakes;
a brake pedal;
one or more sensors configured to obtain sensor data for the vehicle, the sensor data including:
   a state of a brake pedal of the vehicle; and
   a deceleration of the vehicle; and
a processor that is coupled with the one or more sensors and that is configured to:
   compute, based on the sensor data, a trailer weight of the trailer;
   compute, based on the sensor data, a trailer resistance force of the trailer;
   compute a brake utilization factor of the trailer, wherein the brake utilization factor is a function of certain parameters including a vehicle weight of the vehicle and the trailer weight;
   automatically update a trailer brake gain based on both the trailer weight and the trailer resistance force; and
   apply, using the updated trailer brake gain, the trailer brakes in response to an application of the vehicle brakes.

* * * * *